United States Patent [19]
Fridrich et al.

[11] Patent Number: 6,094,483
[45] Date of Patent: Jul. 25, 2000

[54] SECURE ENCRYPTION AND HIDING OF DATA AND MESSAGES IN IMAGES

[75] Inventors: Jiri Fridrich, Johnson City; Richard J. Simard, Rome, both of N.Y.

[73] Assignee: Research Foundation of State University of New York, Albany, N.Y.

[21] Appl. No.: 08/907,157

[22] Filed: Aug. 6, 1997

[51] Int. Cl.[7] .................................................. H04N 7/167
[52] U.S. Cl. ............................................ 380/28; 382/169
[58] Field of Search ................................. 380/10, 28, 37, 380/18, 42, 43, 54; 382/169, 237, 238, 248, 251, 325

[56] References Cited

U.S. PATENT DOCUMENTS

| | | | |
|---|---|---|---|
| 5,748,763 | 5/1998 | Rhoads | 382/115 |
| 5,819,289 | 10/1998 | Sanford, II et al. | 707/104 |

OTHER PUBLICATIONS

Schneier, B. "Applied Cryptography", John Wiley, New York 1996.
Aura, T. "Invisible Communication", Proc. of the Hut Seminar on Network Security '95, Espoo, Finland, Nov. 1995. Telecommunications Software and Multimedia Laboratory, Helsinki University of Technology.
Fridrich, Jiri "Secure Image Ciphering Based on Chaos", Final Report, Rome Laboratory, New York, 1997.

*Primary Examiner*—Tod R. Swann
*Assistant Examiner*—Trevor Quick Coddington
*Attorney, Agent, or Firm*—Salzman & Levy

[57] ABSTRACT

A method of encryption features the steps of first encrypting a message and then hiding (embedding) it within a digital image carrier. This is accomplished by only slightly changing the gray levels of the image carrier. The changes are imperceptible to the human eye, because they appear as random thermal noise that is commonly present in digitized images.

18 Claims, 5 Drawing Sheets

SECURE ENCRYPTION AND HIDING OF DATA AND MESSAGES IN IMAGES

FIELD OF THE INVENTION

The invention relates to methods of encryption and, more particularly, to methods for hiding messages in digital images.

BACKGROUND OF THE INVENTION

This invention belongs to the field of steganography, the science of information hiding. Sending an encrypted message over a public channel gives a clear idea to anybody who intercepts the message that secret communication is occurring. There are cases when it is desirable to hide the very presence of communication while keeping a certain degree of security.

Historically, many steganographic techniques have been designed. Invisible ink, use of clear chemicals that change color when exposed to heat or other chemicals, microdots, and many other techniques have been used in the past. Today, various forms of digitized information, such as digital images, videos, or soundtracks provide a natural environment for hiding secret messages. Specifically, the noise component of such digital information is especially attractive for the aforementioned purpose.

One of the most common steganographic techniques for secret hiding of messages in digital images is called the Least Significant Bit (LSB) encoding. In this technique, a secret message is encoded into the least significant bit of some image. This naive scheme, however, has some obvious drawbacks. Anybody can look at the least significant bit of the image to determine whether a message exists. Second, if one byte is used for representing the color of one pixel (for example, this is true in grayscale images), the secret message can form at most 12.5% of the image size.

In the present invention, a method is provided which uses three-dimensional chaotic maps to encrypt a secret message, which is then embedded into the least two significant bits of the pixel values of some carrier image. The use of three-dimensional chaotic maps is described in copending, U.S. patent application, Ser. No. 08/763,572, filed Dec. 10, 1996, for "METHOD FOR ENCRYPTING AND DECRYPTING DATA USING CHAOTIC MAPS", hereby incorporated by reference. During the embedding process, the carrier image is slightly modified so that the modifications resemble a Gaussian noise invisible to the human eye even under close inspection. The encryption has two functions: it provides security (anybody without the key will be unable to recover the secret message); and, also, the encrypted message is randomized by the encryption. After embedding, it does not create any patterns in the least two significant bits of the carrier image.

This invention uses and extends to the field of steganography the discovery of the class of parametized permutations of a rectangular array of elements (symbols) based on discretized chaotic maps, described in the aforementioned, copending patent application, Ser. No. 08/763,572. A simple software implementation of the new cipher using a desktop computer achieves encryption speeds greater than software implementations of DES that are executed on general purpose computers. Therefore, the invention is a viable and secure alternative to other bulk encryption techniques. It can be used for secure transfer and archival of large quantities of data, such as digital imagery or other large electronic data files.

This invention uses the new class of encryption techniques based on two- and three-dimensional chaotic maps. Chaotic mapping provides excellent security and has many desired cryptographic qualities. It is simple to implement, which results in high encryption rates. A typical software implementation using a 66 MHz Pentium desktop computer achieved a 1 Mb/sec encryption rate. This rate is several orders of magnitude faster than the current software implementation of the public key and bulk encryption methods that utilize higher speed general purpose computers.

Secure transmission and archival of data is of paramount importance to the military, police, and banking industry, and virtually the entire industrial sector in general. Information protection is commonly achieved via encrypting the information using some encryption technique. A large number of powerful encryption schemes, such as DES, RSA, El Gamal, LUCIFER, IDEA, Blowfish (Schneier, B., APPLIED CRYPTOGRAPHY, John Wiley, New York, 1996), etc., have been designed. The security of virtually any encryption technique can be significantly increased if the encrypted information were to look like some other ordinary message (a carrier). The security of the encryption method significantly increases if some useful information can be encrypted and hidden inside some other, innocent-looking message. It is important that an eavesdropper not recognize that some other, secret message is being sent by visually inspecting the carrier message containing the hidden message.

An ideal candidate for hiding secret information is provided by a digitized image. Raw digital images typically contain uncorrelated, thermal Gaussian noise. If a secret message can be masked inside some other image as a random noise, the carrier image with hidden message will not raise a suspicion that some secret information is being sent.

One of the methods for hiding information inside of an ordinary message is to insert "garbage symbols" between the symbols of the secret message. The method requires a mask which can be applied to the text, and which extracts the hidden secret message. However, this method is applicable to text rather than some binary message, such as an image. Also, it is somewhat elaborate and time-consuming to devise an appropriate carrier. Another disadvantage is that the size of the carrier with hidden message significantly exceeds the size of the hidden message, drastically decreasing the efficiency of the whole scheme.

Other methods for hiding information utilize invisible ink, chemical properties of the paper, slight modification of letters, marking letters with pencils, etc. (Schneier, B., APPLIED CRYPTOGRAPHY. John Wiley, New York, 1996). However, since these techniques do not combine encryption with hiding, any person familiar with the principles of the secret embedding can access the secret information.

The scheme described hereinbelow is applicable to both text and binary data files. The expansion factor of the proposed scheme can be made close to 1, if the secret information is a digital image.

To embed a small message of the order of 8 bits or so, an image is scanned until a certain password-dependent message digest hash function returns the required 8-tuple of bits. This has the advantage of absolute secrecy tantamount to one-time pad used in cryptography. The same error distribution and undetectability is guaranteed. Although the scheme satisfies the rigorous requirements of steganographic standards, it is time consuming, has very limited capacity, and is not applicable to image carriers for which only one copy is available.

In "Invisible Communication", by T. Aura, (Proc. of the HUT Seminar on Network Security '95, ESPOO, Finland, November 1995. Telecommunications Software and Multimedia Laboratory, Helsinki University of Technology.), the author suggests changing only a small fraction of the carrier bits (e.g., modifying each hundredth pixel in the carrier by one gray level). Depending on the image noise, these changes are usually compatible with the uncertainties involved with any statistical model of the image.

Before any secret message hiding technique can be considered secure, the carrier image and its statistical properties must be investigated carefully. The noise component may not be uniform within the image, but may depend on the pixel position in the image. For example, pixels corresponding to a bright white color will probably always be saturated at 255, even though the overall model of the noise can be Gaussian with a non-zero variance.

In a black and white image with black pixels corresponding to even gray levels and white pixels corresponding to odd values of gray levels, a large patch of odd pixels, for example, can correspond to pixels saturated at 255 in the original image. Even if only a small fraction of pixels in the image is modified, certain suspicious noise may be introduced into the overflowed patch. This problem with overflow/underflow can of course be avoided by a more careful choice of the carrier image, by preprocessing the carrier, or by instructing the steganographic scheme to avoid the overflowed/underflowed areas.

It is probably impossible to obtain a complete model of the carrier noise, and the search for the perfect steganographic method will probably never be complete. But all good secret hiding schemes must be based on some model of the noise. If it is known that scanned images exhibit larger noise correlations in the horizontal direction and smaller correlations in the vertical direction, while the probability distribution for each pixel (which is neither overflowed nor underflowed) is Gaussian with certain standard deviation, then this evidence is taken into account. The present secret message hiding scheme is adjusted so that the carrier modifications are consistent with the statistical evidence.

An example follows of how to incorporate statistical evidence into the construction of a secret message hiding scheme. Assume that the noise component of pixels with gray levels within the range [L, H] can be modeled with a uniformly valid probability density, f, symmetric around zero. If the secret plain-text message $\{p_i\}_{i=1}^N$ is encrypted, the cipher-text $\{c_i\}_{i=1}^N$ should be a random sequence of ones and zeros. By averaging several scanned versions of the carrier image, a "zero noise" image, Z, is obtained. Using a pseudo-random number generator, we can choose, at random, N pixels in Z with their gray levels in [L, H]. Then, the LSB of those pixels can be modified by the amount of $(2b_i-1)|\eta_i|$, where $\eta_i$ is a random variable with probability distribution f. The remainder of the pixels will be modified by $\eta_i$. The modifications should be consistent with the statistical model.

SUMMARY OF THE INVENTION

In accordance with the present invention, there is provided a method of embedding a secret digital square image with 256 gray levels within an image carrier. The invention is also implemented using color images. The secret image is first encrypted using a chaotic baker map. The resulting image is a random collection of pixels with randomly distributed gray levels without any spatial correlations. Each gray level of the encrypted secret image is coded using four pixels in the carrier. By modifying the gray level of each pixel by 1, 0, −1, −2, four values of information can be hidden. The four pixels hide 4×4×4×4=256 values of gray levels.

The method hides one N×M digitized image with 256 gray levels inside of a carrier 2N×2M pixels with 256 gray levels, although, in other embodiments, this method is also applicable to color images. The method for hiding a secret image inside of a carrier image comprises the steps of:

a) encrypting the secret image N×M pixels with 256 gray levels using a chaotic map;

b) choosing a carrier image 2N×2M pixels with 256 gray levels;

c) modifying the carrier image according to the following pseudo-code:

i) for each pixel P=(i,j) of the secret image, converting the gray level $g_{ij}$ to its base 4 representation t1, t2, t3, t4 (i.e., $g_{ij}$=t1+4*t2+16*t3+64*t4, where 0≦t1, t2, t3, t4≦3);

ii) modifying the gray levels of pixels (2i, 2j), (2i+1, 2j), (2i, 2j+1), (2i+1, 2j+1) by 2−t1, 2−t2, 2−t3, and 2−t4, respectively; and iii) sending the modified image to the recipient.

Care must be taken so that a pixel with a gray level close to zero or close to 255 is not changed to a value outside of the interval [0, 255]. This is arranged by applying special rules for pixels whose gray levels are close to 255 or to zero.

Extracting the secret image from the modified carrier comprises the following steps:

a) subtracting the original (unmodified) carrier from the image received (modified carrier image);

b) extracting the encrypted secret image from the difference image using the pseudocode:

i) for each (i, j), 0≦i≦N−1, 0≦j≦M−1 taking the four values at positions (2i, 2j), (2i+1, 2j), (2i, 2j+1), (2i+1, 2j+1) of the subtracted image (to be t1, t2, t3, t4, respectively); and ii) recovering the gray level $g_{ij}$ of the encrypted image by applying the formula $g_{ij}$=t1+4*t2+16*t3+64*t4, where 0≦t1, t2, t3, t4≦3;

c) decrypting the encrypted image and recovering the original secret image.

Both the sender and the recipient need the original unmodified carrier image and the secret key for encrypting the secret image. Even if an eavesdropper obtains the original image, the secret image is still protected by the chaotic cipher. Thus, the scheme for hiding images provides a high degree of security and does not raise a suspicion that any secret information is being sent.

The encryption, using chaos, has two purposes: first, it increases the security of the scheme; and second, it converts the secret image into an uncorrelated, random-looking image which, when encoded into the carrier, resembles a thermal Gaussian noise commonly present in digital images. This is extremely important because the encoded information is well masked. An eavesdropper will not even suspect that secret information is being sent.

In the above scheme, a carrier 2N×2M image is used to send one secret N×M image. In other words, in order to hide x bytes of information, 4x bytes of data must be sent. The efficiency of the scheme is x/4x=¼. The efficiency can be increased to 1 in either of two ways. First, only two or three pixels in the carrier can be used for coding the information about one pixel of the secret image. This would require modifications of pixels in the carrier image by more than one or two gray or color levels. If two pixels are used instead of four, the efficiency increases from ¼ to ½. Second, if slight modifications of the secret image are acceptable, the color depth of the secret image can be decreased by a factor of two or four, and the efficiency can increase to almost 1. For example, using two pixels in the carrier image per one pixel in the secret image with 121=11×11 gray levels, would result in an efficiency factor equal to 1. This would require modification of the gray levels in the carrier by ±5 gray levels.

In the hiding scheme of this invention, both the sender and the receiver share a secret key for enciphering/deciphering the secret image. They also must know the original carrier image. Since it would not be safe to reuse one carrier image several times, the communicating parties should agree on some database of images from which the carrier images are drawn. The need for sharing a database of images could be overcome by a scheme or agreement in which both parties can fix the least two significant bits of any carrier image. The least two significant bits of the unmodified carrier could be forced to be 0 and 1, for example. This simple agreement, however, would be too transparent for an eavesdropper. A better solution is to use the chaos cipher again. Both parties can request that the least two significant bits of the unmodified carrier be the same as the least two significant bits of some simple seed image (for example, a black square) encrypted ten times using the secret key already shared by both parties. Since the pattern of the least two significant bits is random by all statistical tests, a complex hard-to-detect structure is obtained. Fridrich, Jiri, "Secure Image Ciphering Based on Chaos", Final Report, Rome Laboratory, New York, 1997.

It is an object of this invention to provide a technique for secure encryption and hiding of messages in digital images.

It is another object of this invention to combine the cryptographic technique described in the aforementioned copending patent application, Ser. No. 08/763,572, with a steganographic technique for hiding images in digital images by slightly modifying groups of pixels of the digital image (carrier).

It is yet another object of this invention to provide means for covert communication based on embedding messages in carrier images so that the detection of messages in the carrier is extremely difficult without the knowledge of a secret password.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

The methods of the present invention for hiding secret messages in images are based on a novel approach to cryptography which utilizes the properties of chaotic maps. Chaotic maps offer better advantages for several reasons:

1) chaotic maps provide excellent security and have many desired cryptographic qualities, such as sensitivity to parameters, keys, and initial conditions;

2) they are simple to implement, which results in high encryption rates. A typical software implementation achieves 1 Mb/sec encryption rate on a 66 MHz Pentium machine, which is several orders of magnitude faster than current software implementation of public key cryptographic techniques; and 3) they provide a new paradigm in private key cryptography.

Secure Encryption and Hiding of Data in Images

Figure 1:
FIG. 1 illustrates a scanned image.

Referring now to FIG. 1, consider a secret message to be a digital square image with 256 gray levels. It is clear that any message written in some alphabet can be transformed easily to a square or rectangular array of 8-bit symbols, thus forming "an image."

Figure 2:
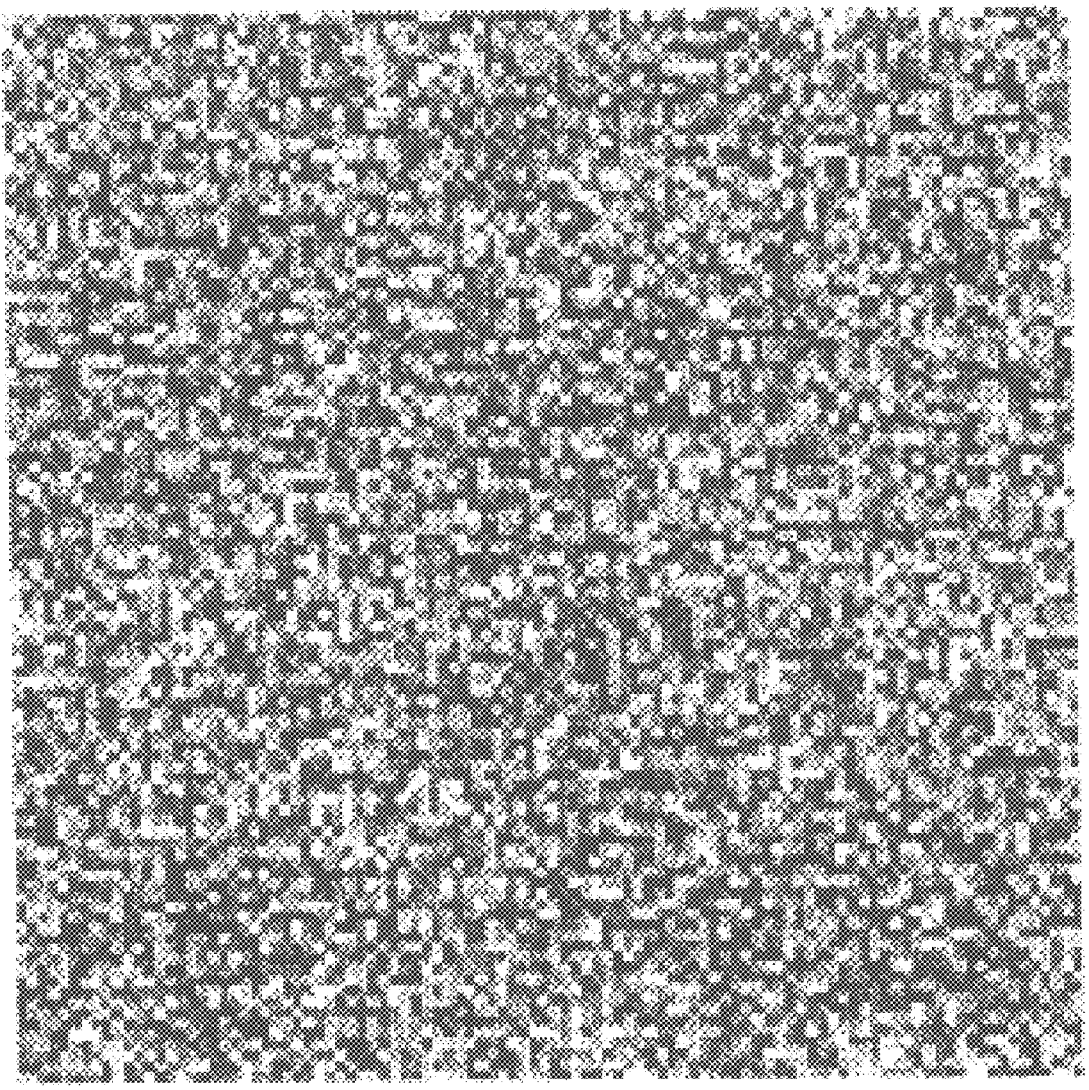
FIG. 2 illustrates the scanned image after applying a 3-D chaotic map.

Referring now to FIG. 2, the secret image is first encrypted using a chaotic baker map. The resulting image is a random collection of pixels with randomly distributed gray levels without any spatial correlations. The histogram is evenly distributed. Each gray level of the encrypted secret image will be coded using four pixels in the carrier. By modifying the gray level of each pixel by 1, 0, −1, −2, four values of information can be hidden. Therefore, four pixels can hide 4×4×4×4=256 values of gray levels.

Figure 3:
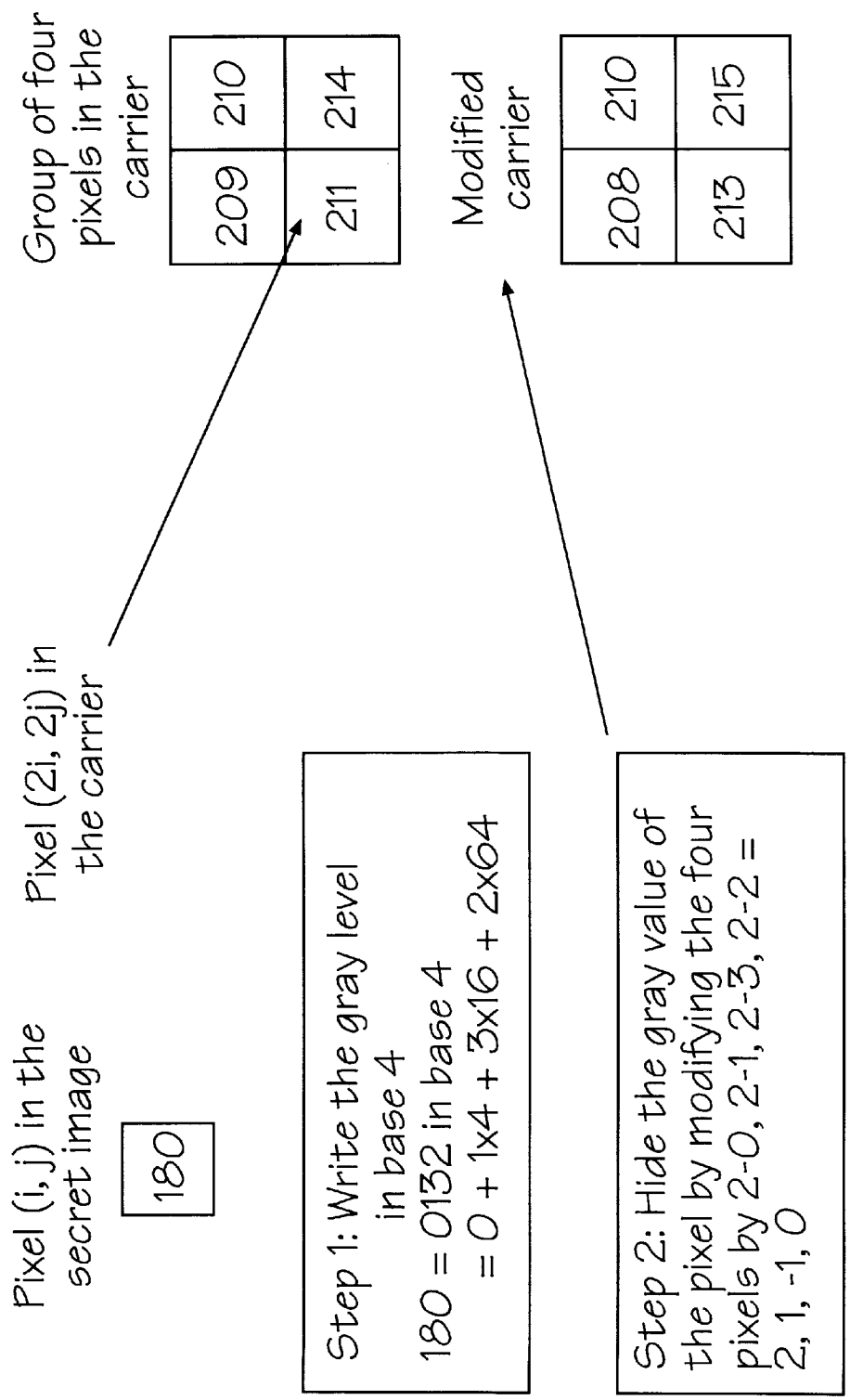
FIG. 3 illustrates a schematic diagram of the encryption and hiding of data within an image, in accordance with the invention.

Referring to FIG. 3, the process of coding an image inside of a carrier image is shown. The method of this invention combines the secure chaos-based encryption techniques as described in the aforementioned, copending patent application, Ser. No. 08/763,572, and a steganographic method similar to the LSB method. As aforementioned, the appearance of the carrier with the hidden secret message is such that an eavesdropper does not even suspect that secret information is being sent. The security of the scheme further increases if the secret message is encrypted before it is hidden in the carrier. It is important that a potential eavesdropper should not be able to recognize that a secret message is being transmitted even under close scrutiny of the carrier message. A message is hidden inside a digital image by slightly modifying the gray levels of the carrier image. The modifications will have the properties of thermal, Gaussian noise commonly present in digitized images taken with CCD elements or with an ordinary scanner.

Figure 4:
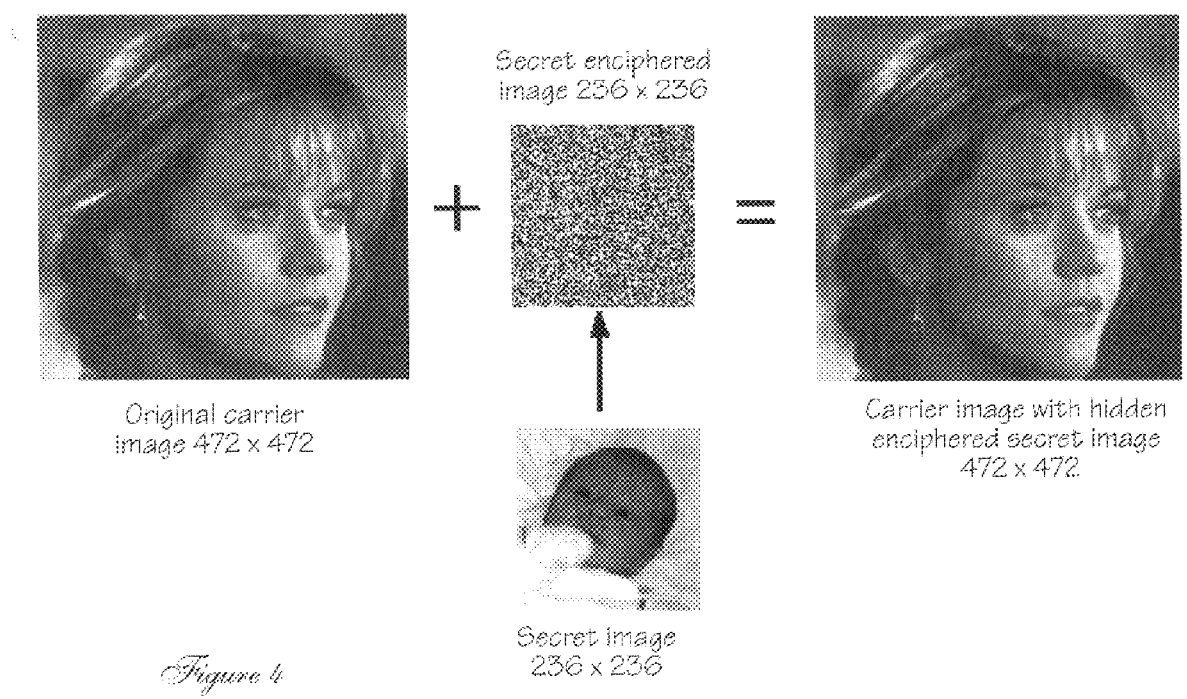
FIG. 4 depicts an illustrative view of one example of practicing the inventive embedding or hiding method.

Referring now to FIG. 4, there is shown the method for hiding one N×M digitized image with 256 gray levels inside a carrier 2N×2M pixels with 256 gray levels. A typical secret 236×236 image, a typical 472×472 carrier image, and the typical carrier image containing the embedded encrypted secret image is shown.

Algorithmic Scheme for Hiding a Secret Image Inside a Carrier Image

Figure 5:
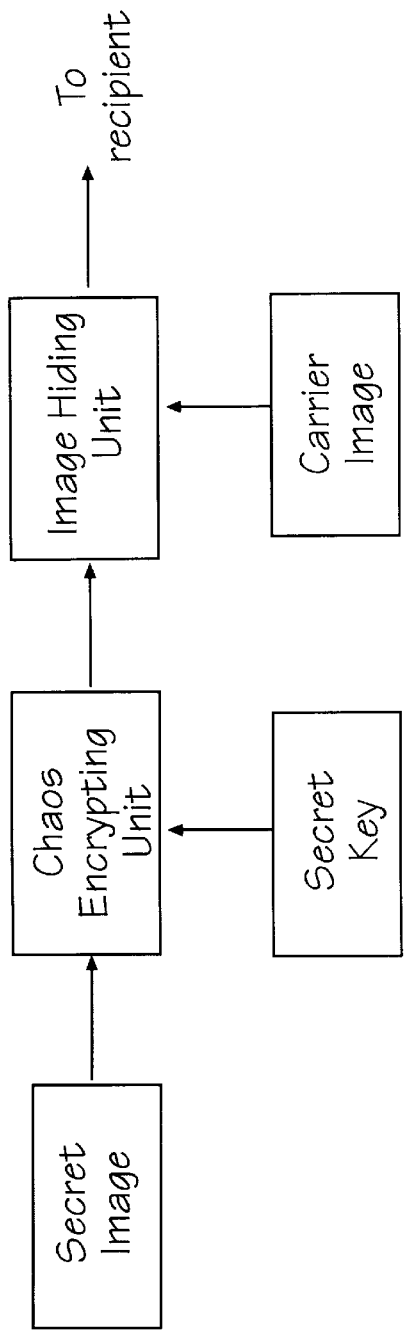
FIG. 5 depicts a block diagram of a method for hiding images in accordance with the invention.

Referring to FIG. 5, a general scheme for hiding images is illustrated. The scheme comprises the steps of:

a) encrypting the secret image N×M pixels with 256 gray levels using a chaotic map, as previously described;

b) choosing some carrier image 2N×2M pixels with 256 gray levels;

c) modifying the carrier image according to the following pseudocode:

i) For each pixel P=(i, j) of the secret image, convert the gray level $g_{ij}$ to base 4 (i.e., $g_{ij=t1}+4*t2+16*t3+64*t4$, where $0 \leq t1, t2, t3, t4 \leq 3$);

ii) modify the gray levels of pixels (2i, 2j), (2i+1, 2j), (2i, 2j+1), (2i+1, 2j+1) by 2-t1, 2-t2, 2-t3, and 2-t4, respectively; and iii) send the modified image to the recipient.

In part (ii), care must be taken so that a pixel with a gray level close to zero or close to 255 is not changed to a value outside of the interval [0, 255]. This can be arranged easily by applying special rules for pixels whose gray levels are close to 255 or to zero.

Extracting the Secret Image from the Modified Carrier

Figure 6:
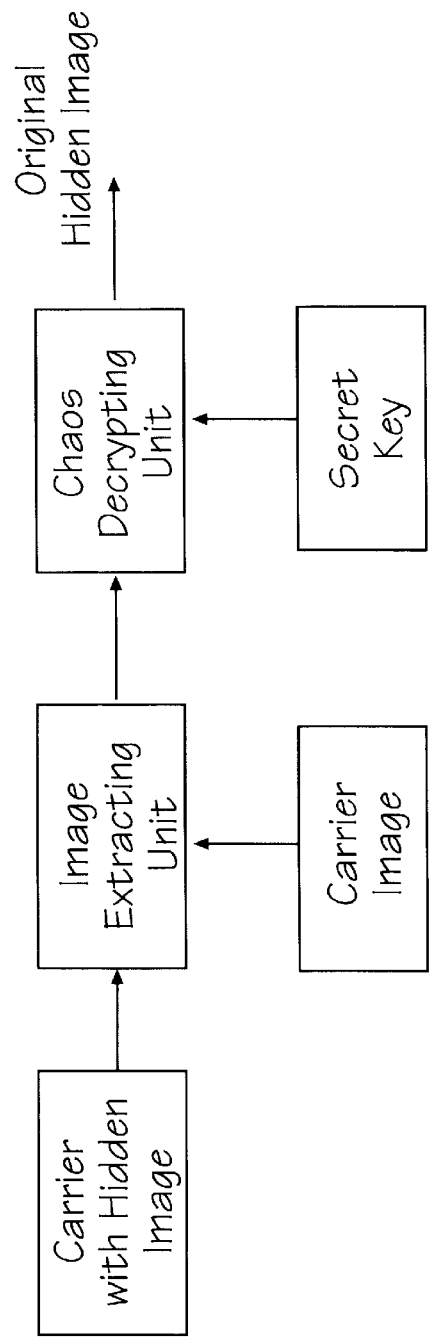
FIG. 6 shows a block diagram of a method of deciphering and recovering the hidden image of FIG. 4.

Referring to FIG. 6, a general scheme is shown for extracting a secret image from a modified carrier. Extraction comprises the following steps:

a) subtract the original (unmodified) carrier from the image received (modified carrier) using the pseudocode:

i) for each (i, j), $0 \leq i \leq N-1$ and $0 \leq j \leq M-1$, take the four values at positions (2i, 2j), (2i+1, 2j), (2i, 2j+1), (2i+1, 2j+1)) of the subtracted image; and ii) recover the gray level $g_{ij}$ of the encrypted image by applying the formula $g_{ij}=t1+4\ t2+16\ t3+64\ t4$, where $0 \leq t1, t2, t3, t4 \leq 3$; and b) decrypt the encrypted image and recover the original secret image.

Both the sender and the recipient need the original unmodified carrier image and a secret key for encrypting the secret image. Even if an eavesdropper obtains the original image, the secret image is still protected by the chaotic cipher. Thus, the scheme for hiding images provides a high degree of security and does not raise a suspicion that any secret information is being sent.

It is possible to modify the hiding scheme so that knowledge of the exact form of the carrier image is not necessary, as explained hereinafter.

Encryption using chaos has two purposes. First, it increases the security of the scheme. Second, it converts the secret image into an uncorrelated, random-looking image which, when encoded into the carrier, resembles thermal Gaussian noise commonly present in digital images. This is extremely important because the encoded information is well masked. An eavesdropper will not even suspect that a secret information is being sent.

In the above scheme, a carrier 2N×2M image is used to send one secret N×M image. In other words, in order to hide x bytes of information, 4x bytes of data must be sent. The efficiency of the scheme is x/4x=¼. Ideally, the efficiency should be as close to 1 as possible. It is possible to increase the efficiency (bandwidth) of the scheme by:

1) using only two or three pixels in the carrier for coding the information about one pixel of the secret image. This requires modifications of pixels in the carrier image by more than one or two gray levels. If two pixels are used instead of four, the efficiency increases from ¼ to ½; and 2) if slight modifications of the secret image are acceptable, the color depth of the secret image can be decreased by a factor of two or four, and the efficiency increased to almost 1. For example, using two pixels in the carrier image per one pixel in the secret image and using 121 (11×11) gray levels would result in an efficiency factor equal to 1. This would require modification of the gray levels in the carrier by ±5 gray levels.

In the hiding scheme described above, both the sender and the receiver share a secret key for enciphering/deciphering the secret image. They also know the original carrier image. Since sharing a carrier image requires processing of a great amount of information, it would be desirable to eliminate the need for exact knowledge of the unmodified carrier. It is possible to modify the scheme to achieve that goal.

One possible approach to this problem is to design a scheme (an agreement) wherein both parties can fix the least two significant bits of any carrier image. Of course, the least two significant bits of the unmodified carrier could be restricted to 0 and 1, for example. However, this simple agreement would be too transparent for an eavesdropper. A better solution is to use the chaos cipher again. For example, the least two significant bits of the unmodified carrier could be forced to be the same as the least two significant bits of some simple seed image (for example, a black square) encrypted ten times using the secret key already shared by both parties. Since the pattern of the least two significant bits is random by all statistical tests, a complex, hard-to-detect structure is obtained.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

APPENDIX

Hide.c              3/6/97              12:05:27 PM

```c
//
//
// Hide.c was developed under Rome Laboratory Contract F30602-96-1-0047
// by Dr. Jiri Fridrich and Mr. Richard Simard.  This version of Hide.c
// works on graphical images in the Sun Raster format.  A version of Hide.c
// that works on PGM images is available.
//
// Date: 6 March 1997
//
//
#include <math.h>
#include <stdlib.h>
#include <stdio.h>
#include <string.h>
include <time.h> define MAXLENGTH 1024 struct finite_vector
{
   int arr[MAXLENGTH];
   int len;
};

int rnd(int low, int high);
int sint(float x);
void getras(char filein[], int* M, int* N, int* L, int*** a);
void makeras(char fileout[], int M, int N, int L, int** a);
void getcipher(char* file, char* ciphertype, char* grey, char* keytype, int* iter, int* seed);
char* c_(char file[]);
char* key_(char file[]);
char* remc_(char file[]);
void storekey(char* file, char ciphertype, char grey, char keytype, int iter, int seed, struct fin
ite_vector key);
void getkey(struct finite_vector* key, char* file);
int** matrix(int M, int N);
void randkeya(int seed, int N, struct finite_vector* key);
void randkeyb(int seed, int N, struct finite_vector* key);
void showkey(struct finite_vector key);
void finddiv(int N, struct finite_vector* m);
void dx(int d, unsigned char* s);
int xd(unsigned char* s);

void dx(int d, unsigned char* s)
{
   int i, rem;

for(i=3,rem=d;i>=0;i--)
   {
      rem=d%256;
      s[i]=rem;
      d=(d-rem)/256;
   }
} int xd(unsigned char* s)
{
   int i;
   long int exp=1;
```

Hide.c                          3/6/97                                12:05:28 PM

```c
  int aux=0;

for(i=3;i>=0;i--)
  {
    aux+=((int) s[i])*exp;
    exp*=256;
  }
  return(aux);
}

/**** rnd returns a random integer rnd, low <= rnd < high ****/
/**** typical use: rnd(0, N) ****/
int rnd(int low, int high)
{
  return((int) ((high-low)*(rand()/(float) RAND_MAX)) + low);
}

/**** sint(x) is the integer part of x. ****/
/**** Note: if x=-5.332, sint(x)=-6 ! As it should be. ****/
int sint(float x)
{
  if(x<0 && x-((int) x)!=0) return(((int) x) - 1);
  else                      return((int) x);
} int** matrix(int N, int M)
{
  int i;
  int** a;

a = (int**)malloc(N*sizeof(int*));
  if(a==NULL) {printf("NULL in a\n");exit(1);} for (i = 0; i < N; i++)
  {
    a[i] = (int*)malloc(M*sizeof(int));
    if(a[i]==NULL) {printf("NULL in a[%d]\n",i);exit(1);}
  }
  return(a);
} char* c_(char file[])
{
  int i=1;
  char* s;

s=(char*) malloc(20*sizeof(char));
  if(s==NULL) {printf("NULL in c_\n");exit(1);}
  s[0]='c';s[1]='_';
  do
  {
    i++;
    s[i]=file[i-2];
  } while(file[i-2]!='\0');
  return(s);
} char* key_(char file[])
{
```

Hide.c                           3/6/97                                  12:05:28 PM

```c
    int i=-1;
    char* s;

s=(char*) malloc(20*sizeof(char));
    if(s==NULL) {printf("NULL in key\n");exit(1);}
    do {i++;s[i]=file[i];} while (file[i]!='.');
    s[i+1]='k';s[i+2]='e';s[i+3]='y';
    s[i+4]='\0';
    return(s);
} char* remc_(char file[])
{
    int i=2;
    char* s;

s=(char*) malloc(20*sizeof(char));
    if(s==NULL) {printf("NULL in remc\n");exit(1);} if(file[0]!='c' || file[1]!='_')
    {
      printf("The name of the encoded file must be c_*.ras\n. Exiting.\n");
      exit(1);
    } do {s[i-2]=file[i];} while(file[i++]!='\0');
    return(s);
} void getras(char filein[], int* N, int* M, int* L, int*** a)
{
    unsigned char ch1;
    unsigned char *aux, *row;
    int i, j;
    FILE* fpin;

aux=(unsigned char*) malloc(4*sizeof(unsigned char));

if((fpin=fopen(filein, "rb"))==NULL)
    {
      printf("Cannot open the input image file.\n");
      printf("Check the name of the file and its directory.\n");
      exit(1);
    } fscanf(fpin,"%4c", aux);

for(i=0;i<4;i++) fscanf(fpin,"%c", &aux[i]);*N=xd(aux);
    for(i=0;i<4;i++) fscanf(fpin,"%c", &aux[i]);*M=xd(aux);
    for(i=1;i<=788;i++) fscanf(fpin,"%c", &ch1);

*a=matrix(*N,*M);

row=(unsigned char*) malloc((*N)*sizeof(unsigned char));
    if(row==NULL) {printf("Null assignment to row\n");exit(1);} for(j=0;j<*M;j++)
    {
      fread(row, sizeof(char), *N, fpin);
      for(i=0;i<*N;i++) (*a)[i][j]=row[i];
    }
```

Hide.c                              3/6/97                                    12:05:28 PM

```c
      fclose(fpin);
} void makeras(char fileout[], int N, int M, int L, int** a)
{
  int i, j, k;
  int Bits, Cml, Rcmt, Rastertype, Imagelength;
  int m1, m2, m3, m4;
  unsigned char ch1;
  unsigned char *aux, *row;
  FILE* fpout;

if((fpout=fopen(fileout, "wb"))==NULL)
  {
    printf("Cannot open the output image file.\n");
    exit(1);
  }

Bits=8;Imagelength=N*M;Rastertype=1;Rcmt=1;Cml=3*256;
  m1=89;m2=166;m3=106;m4=149;

aux=(unsigned char*) malloc(4*sizeof(unsigned char));
  row=(unsigned char*) malloc(N*sizeof(unsigned char));

fprintf(fpout,"%c%c%c%c", m1, m2, m3, m4);
  dx(N,aux);fprintf(fpout,"%c%c%c%c", aux[0], aux[1], aux[2], aux[3]);
  dx(M,aux);fprintf(fpout,"%c%c%c%c", aux[0], aux[1], aux[2], aux[3]);
  dx(Bits,aux);fprintf(fpout,"%c%c%c%c", aux[0], aux[1], aux[2], aux[3]);
  dx(Imagelength,aux);fprintf(fpout,"%c%c%c%c",aux[0],aux[1],aux[2],aux[3]);
  dx(Rastertype,aux);fprintf(fpout,"%c%c%c%c",aux[0],aux[1],aux[2],aux[3]);
  dx(Rcmt,aux);fprintf(fpout,"%c%c%c%c", aux[0], aux[1], aux[2], aux[3]);
  dx(Cml,aux);fprintf(fpout,"%c%c%c%c", aux[0], aux[1], aux[2], aux[3]);

for(j=1;j<=3;j++)
  {
    for(i=0;i<256;i++) fprintf(fpout,"%c", i);
  } for(k=1;k<=1;k++)
  {
    for(j=0;j<M;j++)
    {
      for(i=0;i<N;i++) row[i]=a[i][j];
      fwrite(row, sizeof(char), N, fpout);
    }
  } fclose(fpout);
} void getcipher(char* file, char* ciphertype, char* grey, char* keytype, int* iter, int* seed)
{
  unsigned char ch1;
  FILE* fpin;

if((fpin=fopen(file, "rb"))==NULL)
  {
    printf("Create .key file for the image. Exiting.\n");
```

```
                                  Hide.c                    3/6/97                          12:05:28 PM exit(1);
  }
  do
  {
    fscanf(fpin, "%c", &ch1);
  } while(ch1!='=');

fscanf(fpin, "%c", &ch1);
  fscanf(fpin, "%c", ciphertype);

do
  {
    fscanf(fpin, "%c", &ch1);
  } while(ch1!='=');

fscanf(fpin, "%c", &ch1);
  fscanf(fpin, "%c", grey);

do
  {
    fscanf(fpin, "%c", &ch1);
  } while(ch1!='=');

fscanf(fpin, "%c", &ch1);
  fscanf(fpin, "%c", keytype);

do
  {
    fscanf(fpin, "%c", &ch1);
  } while(ch1!='=');

fscanf(fpin, "%d", iter);

do
  {
    fscanf(fpin, "%c", &ch1);
  } while(ch1!='=');

fscanf(fpin, "%d", seed);
} void storekey(char* file, char ciphertype, char grey, char keytype, int iter, int seed, struct fin
ite_vector key)
{
  int i;
  FILE* fpin;

if((fpin=fopen(file, "wb"))==NULL)
  {
    printf("\n*.key file not found. Exiting.\n");
    exit(1);
  } fprintf(fpin, "TYPE OF CIPHERING         = %c\n", ciphertype);
  fprintf(fpin, "GREY LEVEL MIXING         = %c\n", grey);
  fprintf(fpin, "KEY TYPE (RANDOM/CUSTOM)  = %c\n", keytype);
  fprintf(fpin, "NUMBER OF ITERATIONS      = %d\n", iter);
  fprintf(fpin, "SEED                      = %d\n", seed);
```

```
    fprintf(fpin, "KEY                      = ");
    for(i=0;i<key.len;i++) fprintf(fpin, "%d ", key.arr[i]);
    fclose(fpin);
}
void getkey(struct finite_vector* key, char* file)
{
    int i=0, count=0;
    unsigned char ch;
    FILE* fpin;

if((fpin=fopen(file, "rb"))==NULL)
    {
        printf("\n.key file not found. Exiting.\n");
        exit(1);
    } while(count<6)
    {
        fscanf(fpin, "%c", &ch);
        if(ch=='=') count++;
    } while(fscanf(fpin, "%d", &key->arr[i++])!=EOF);

key->len=i-1;
    fclose(fpin);
}
/************************************************************************/
/*** finddiv(N,m) returns the divisors of N. They are stored in
     the structure m, m.len=number of divisors, m.arr[] are the
     divisors.
************************************************************************/
void finddiv(int N, struct finite_vector* m)
{
    int i, count;

for(i=1, count=0;i<=N/2;i++)
    {
        if(N%i==0) m->arr[count++]=i;
    }
    m->len=count;
}
/************************** VERSION A **********************************/
/***  randkeya(seed,N,key) finds a random key for the integer N
      seed is used as a seed for srand(), the key is stored in key.
************************************************************************/
void randkeya(int seed, int N, struct finite_vector* key)
{
    int i, irand;
    struct finite_vector m;

srand(seed);
    finddiv(N,&m);
    i=0;
    while(N>0)
    {
        do
```

```
Hide.c                        3/6/97                              12:05:29 PM {
          irand=rnd(0, m.len);
        } while(m.arr[irand]>N);

key->arr[i++]=m.arr[irand];
        N-=m.arr[irand];
    } key->len=i;
}
/*************************** VERSION B ***********************************/
/***  randkeyb(seed,N,key) finds a random key for the integer N
      seed is used as a seed for srand(), the key is stored in key.
***********************************************************************/
void randkeyb(int seed, int N, struct finite_vector* key)
{
    int i,j,k,x,le,flag;
    int aux[MAXLENGTH];

srand(seed);
    le=rnd(10,15);
    aux[0]=0;
    aux[1]=N;
    i=1;

while(i<le)
    {
        x=rnd(0,N);
        flag=0;

for(k=0;k<=i;k++) if(x==aux[k]) flag=1;

if(flag!=1)
        {
            i++;
            for(k=1;k<=i;k++)
            {
                if(x<aux[k] && x>aux[k-1])
                {
                    for(j=i;j>=k;j--)
                    {
                        aux[j+1]=aux[j];
                    }
                    aux[k]=x;
                }
            }
        }
    } for(i=0;i<le;i++) key->arr[i]=aux[i+1]-aux[i];
    /*for(i=0;i<le;i++) printf("%d ", key->arr[i]);*/ key->len=le;
}

/***********************************************************************/
/****  showkey prints the length of the key, and, on a separate line,
      the key itself (numbers divided by spaces).
***********************************************************************/
void showkey(struct finite_vector key)
```

Hide.c                          3/6/97                                12:05:29 PM

```c
{
  int i;

printf("Length of the key    : %d\n", key.len);
  printf("Ciphering key        : ");
  for(i=0;i<key.len;i++) printf("%d ", key.arr[i]);
  printf("\n");
}

/**********************************************************************/
/**********************************************************************/
/**********************************************************************/
/**********************************************************************/
/**********************************************************************/
/**********************************************************************/
void main(int argc, char *argv[])
{
  int **sb, **nsb, **a, **t1, **t2;
  int i, j, k, r, s, rr, ss, M, N, L;
  int Na, Ma, La, p, q;
  int iter, seed, aux;
  int li[MAXLENGTH], ri[MAXLENGTH], re[MAXLENGTH];
  int co[MAXLENGTH];
  int t[2][2];
  int **inca, **ninca;
  int det, sum, raux, count, it, ng;
  char ciphertype, keytype, grey;
  struct finite_vector key;
  char image_name[64],carrier_image_name[64];

if(argc == 3)
  {
    strcpy(image_name,argv[1]);
    strcpy(carrier_image_name,argv[2]);
  }
  else
  {
    do printf("Enter the image name and the carrier image name: ");
    while(scanf("%s %s",image_name,carrier_image_name) != 2);
  }

/********************************************************************
   ****************   GETTING THE IMAGE IN RAS FORMAT   ***************
   ********************************************************************/
  getras(image_name, &N, &M, &L, &sb);L=255;
  printf("N = %d   M = %d\n", N, M);

inca=matrix(N,M);
  ninca=matrix(N,M);
  t1=matrix(N,M);
  t2=matrix(N,M);

getcipher(key_(image_name), &ciphertype, &grey, &keytype, &iter, &seed);

printf("\n");
  printf("Ciphertype           : %c\n", ciphertype);
  printf("Grey level mixing    : %c\n", grey);
  printf("Keytype              : %c\n", keytype);
  printf("Number of iterations : %d\n", iter);

/********************************************************************
```

Hide.c    3/6/97    12:05:29 PM

```c
/*****************  GETTING THE KEY FOR THE BAKER MAP  ****************
*********************************************************************/
if(ciphertype=='B')
{
  if(keytype=='R')
  {
    randkeyb(seed, N, &key);
    storekey(key_(image_name),ciphertype,grey,keytype,iter,seed,key);
  }
  else
  {
    getkey(&key, key_(image_name));
  } for(i=0, sum=0;i<key.len;i++) sum+=key.arr[i];

if(sum!=N)
  {
    printf("The key is incorrect. The sum is not equal to N.\n");
    printf("Enter new key in file *.key. Exiting.\n");
    exit(1);
  } showkey(key);
}
/*********************************************************************
**********  CALCULATING THE TRANSFER MATRIX FOR BAKER MAP  ***********
*********************************************************************/
if(ciphertype=='B')
{
  ri[0]=key.arr[0]-1;li[0]=0;
  for(i=1;i<key.len;i++)
  {
    li[i]=ri[i-1];
    ri[i]=ri[i-1]+key.arr[i];
  } re[0]=key.arr[0]*M % N;
  for(i=1;i<key.len;i++) re[i]=(key.arr[i]*M+re[i-1]) % N;

for(i=0,k=0;i<N;i++)
  {
    for(j=0;j<M;j++)
    {
      if(i<ri[k] || (i==ri[k]&&j<M-re[k])) inca[i][j]=k;
      else inca[i][j]=++k;
    }
  } for(k=0,count=0;k<key.len;k++)
  {
    for(j=0;j<M;j++)
    {
      for(i=li[k];i<=ri[k];i++) if(inca[i][j]==k) ninca[i][j]=count++/N;
    }
  } for(j=0;j<M;j++) co[j]=0;

for(i=0;i<N;i++)
```

Hide.c  3/6/97  12:05:29 PM

```c
    {
      for(j=0;j<M;j++)
      {
        t1[i][j]=co[ninca[i][j]] % N;
        t2[i][j]=ninca[i][j];
        co[ninca[i][j]]+=1;
      }
    }
  } free(inca);
  free(ninca);

/*********************************************************************
   ********* ENCRYPTING USING THE TRANSFER MATRIX FOR BAKER *************
   *********************************************************************/
  printf("Encrypting.\n");

nsb=matrix(N,M);

for(s=0;s<M;s++)
  {
    for(r=0;r<N;r++)
    {
      rr=r;ss=s;ng=sb[r][s];
      for(it=1;it<=iter;it++)
      {
        if(grey=='Y') ng=(ng+ss*rr) % 256;
        /*if(grey=='Y') ng=ng^ss;*/
        raux=t1[rr][ss];
        ss=t2[rr][ss];
        rr=raux;
      } if(rr>=N || ss>=M) {printf("rr or ss out of range. Exiting.\n"); exit(1);} nsb[rr][ss]=ng;
    }
  }
  free(t1);
  free(t2);
  free(sb);

/*********************************************************************
   ************ HIDING THE ENCRYPTED IMAGE INSIDE OTHER IMAGE ***********
   *********************************************************************/
  getras(carrier_image_name, &Na, &Ma, &La, &a);La=255;
  /**** Na x Ma ... dimensions of the carrier image
        La ........ number of gray levels of the carrier image
        a[][] ..... matrix of gray levels of the carrier image ****/

/**** Check if the carrier image has twice as many pixels as the
        subliminal image ****/ if(Na!=2*N || Ma!=2*M || La!=L)
  {
    printf("Image dimensions do not match. Exiting.\n");
    exit(1);
  }
```

Hide.c                              3/6/97                              12:05:30 PM

```c
    for(p=0;p<N;p++)
    {
      for(q=0;q<M;q++)
      {
        auxi=nsb[p][q];

/**** the gray level nsb[][]=t[0][0]+4t[1][0]+16t[0][1]+64t[1][1]
              where 0 <= t[i][j] < 4 ****/ for(j=0;j<2;j++)
        {
          for(i=0;i<2;i++)
          {
            t[i][j]=auxi % 4;
            auxi=auxi/4;
          }
        }

/**** for gray levels a[i][j] in interval [2,L-1], we calculate
              modified a[i][j] as a[i][j]-t+1
              When a[i][j]=L, we put a[i][j]-t
              When a[i][j]=1, we put a[i][j]-t+2
              When a[i][j]=0, we put a[i][j]-t+3 ****/ for(i=0;i<2;i++)
        {
          for(j=0;j<2;j++)
          {
            auxi=a[2*p+i][2*q+j];
            if(auxi==L)
                auxi-=t[i][j];
            else if(auxi<L && auxi>=2)
                auxi+=1-t[i][j];
            else if(auxi==1)
                auxi+=2-t[i][j];
            else if(auxi==0) auxi+=3-t[i][j];

a[2*p+i][2*q+j]=auxi;
          }
        }
      }
    } printf("Storing the hidden image as subli.ras\n");
    makeras("subli.ras", Na, Ma, La, a);
}
```

Extract.c                                  3/6/97                                  11:57:19 AM

```c
//
//
// Extract.c was developed under Rome Laboratory Contract F30602-96-1-0047
// by Dr. Jiri Fridrich and Mr. Richard Simard.  This version of Extract.c
// works on graphical images in the Sun Raster format.  A version of Extract.c
// that works on PGM images is available.
//
// Date: 6 March 1997
//
//
#include <math.h>
#include <stdlib.h>
#include <stdio.h>
#include <string.h>
include <time.h> define MAXLENGTH 1024 struct finite_vector
{
  int arr[MAXLENGTH];
  int len;
};

int rnd(int low, int high);
int sint(float x);
void getras(char filein[], int* M, int* N, int* L, int*** a);
void makeras(char fileout[], int M, int N, int L, int** a);
void getcipher(char* file, char* ciphertype, char* grey, char* keytype, int* iter, int* seed);
char* c_(char file[]);
char* key_(char file[]);
char* remc_(char file[]);
void storekey(char* file, char ciphertype, char grey, char keytype, int iter, int seed, struct fir
ite_vector key);
void getkey(struct finite_vector* key, char* file);
int** matrix(int M, int N);
void randkeya(int seed, int N, struct finite_vector* key);
void randkeyb(int seed, int N, struct finite_vector* key);
void showkey(struct finite_vector key);
void finddiv(int N, struct finite_vector* m);
void dx(int d, unsigned char* s);
int xd(unsigned char* s);

void dx(int d, unsigned char* s)
{
  int i, rem;

for(i=3,rem=d;i>=0;i--)
  {
    rem=d%256;
    s[i]=rem;
    d=(d-rem)/256;
  }
} int xd(unsigned char* s)
{
  int i;
  long int exp=1;
  int aux=0;
```

Extract.c                               3/6/97                                    11:57:19 AM

```c
  for(i=3;i>=0;i--)
  {
    aux+=((int) s[i])*exp;
    exp*=256;
  } return(aux);
}

/**** rnd returns a random integer rnd, low <= rnd < high ****/
/**** typical use: rnd(0, N) ****/
int rnd(int low, int high)
{
  return((int) ((high-low)*(rand()/(float) RAND_MAX)) + low);
}

/**** sint(x) is the integer part of x. ****/
/**** Note: if x=-5.332, sint(x)=-6 ! As it should be. ****/
int sint(float x)
{
  if(x<0 && x-((int) x)!=0) return(((int) x) - 1);
  else                      return((int) x);
} int** matrix(int N, int M)
{
  int i;
  int** a;

a = (int**)malloc(N*sizeof(int*));
  if(a==NULL) {printf("NULL in a\n");exit(1);} for (i = 0; i < N; i++)
  {
    a[i] = (int*)malloc(M*sizeof(int));
    if(a[i]==NULL) {printf("NULL in a[%d]\n",i);exit(1);}
  }
  return(a);
} char* c_(char file[])
{
  int i=1;
  char* s;

s=(char*) malloc(20*sizeof(char));
  if(s==NULL) {printf("NULL in c_\n");exit(1);}
  s[0]='c';s[1]='_';
  do
  {
    i++;
    s[i]=file[i-2];
  } while(file[i-2]!='\0');

return(s);
} char* key_(char file[])
{
  int i=-1;
  char* s;
```

Extract.c                         3/6/97                                      11:57:19 AM

```c
    s=(char*) malloc(20*sizeof(char));
    if(s==NULL) {printf("NULL in key\n");exit(1);}
    do {i++;s[i]=file[i];} while (file[i]!='.');

s[i+1]='k';s[i+2]='e';s[i+3]='y';
    s[i+4]='\0';

return(s);

} char* remc_(char file[])
{
  int i=2;
  char* s;

s=(char*) malloc(20*sizeof(char));
  if(s==NULL) {printf("NULL in remc\n");exit(1);}
  if(file[0]!='c' || file[1]!='_')
  {
    printf("The name of the encoded file must be c_*.pgm\n. Exiting.\n");
    exit(1);
  } do {s[i-2]=file[i];} while(file[i++]!='\0');

return(s);
}
void getras(char filein[], int* N, int* M, int* L, int*** a)
{
  unsigned char ch1;
  unsigned char *aux, *row;
  int i, j;
  FILE* fpin;

aux=(unsigned char*) malloc(4*sizeof(unsigned char));

if((fpin=fopen(filein, "rb"))==NULL)
  {
    printf("Cannot open the input image file.\n");
    printf("Check the name of the file and its directory.\n");
    exit(1);
  } fscanf(fpin,"%4c", aux);
  for(i=0;i<4;i++) fscanf(fpin,"%c", &aux[i]);*N=xd(aux);
  for(i=0;i<4;i++) fscanf(fpin,"%c", &aux[i]);*M=xd(aux);
  for(i=1;i<=788;i++) fscanf(fpin,"%c", &ch1);

*a=matrix(*N,*M);

row=(unsigned char*) malloc((*N)*sizeof(unsigned char));
  if(row==NULL) {printf("Null assignment to row\n");exit(1);} for(j=0;j<*M;j++)
  {
    fread(row, sizeof(char), *N, fpin);
    for(i=0;i<*N;i++) (*a)[i][j]=row[i];
  }
```

Extract.c                         3/6/97                              11:57:20 AM

```c
    fclose(fpin);
}
void makeras(char fileout[], int N, int M, int L, int** a)
{
  int i, j, k;
  int Bits, Cml, Rcmt, Rastertype, Imagelength;
  int m1, m2, m3, m4;
  unsigned char ch1;
  unsigned char *aux, *row;
  FILE* fpout;

if((fpout=fopen(fileout, "wb"))==NULL)
  {
    printf("Cannot open the output image file.\n");
    exit(1);
  }

Bits=8;Imagelength=N*M;Rastertype=1;Rcmt=1;Cml=3*256;
  m1=89;m2=166;m3=106;m4=149;

aux=(unsigned char*) malloc(4*sizeof(unsigned char));
  row=(unsigned char*) malloc(N*sizeof(unsigned char));

fprintf(fpout,"%c%c%c%c", m1, m2, m3, m4);
  dx(N,aux);fprintf(fpout,"%c%c%c%c", aux[0], aux[1], aux[2], aux[3]);
  dx(M,aux);fprintf(fpout,"%c%c%c%c", aux[0], aux[1], aux[2], aux[3]);
  dx(Bits,aux);fprintf(fpout,"%c%c%c%c", aux[0], aux[1], aux[2], aux[3]);
  dx(Imagelength,aux);fprintf(fpout,"%c%c%c%c",aux[0],aux[1],aux[2],aux[3]);
  dx(Rastertype,aux);fprintf(fpout,"%c%c%c%c",aux[0],aux[1],aux[2],aux[3]);
  dx(Rcmt,aux);fprintf(fpout,"%c%c%c%c", aux[0], aux[1], aux[2], aux[3]);
  dx(Cml,aux);fprintf(fpout,"%c%c%c%c", aux[0], aux[1], aux[2], aux[3]);

for(j=1;j<=3;j++)
  {
    for(i=0;i<256;i++) fprintf(fpout,"%c", i);
  } for(k=1;k<=1;k++)
  {
    for(j=0;j<M;j++)
    {
      for(i=0;i<N;i++) row[i]=a[i][j];
      fwrite(row, sizeof(char), N, fpout);
    }
  }
  fclose(fpout);
}
void getcipher(char* file, char* ciphertype, char* grey, char* keytype, int* iter, int* seed)
{
  unsigned char ch1;
  FILE* fpin;

if((fpin=fopen(file, "rb"))==NULL)
  {
    printf("Create .key file for the image. Exiting.\n");
    exit(1);
  }
```

Extract.c                                3/6/97                                    11:57:20 AM

```c
  do
  {
    fscanf(fpin, "%c", &ch1);
  } while(ch1!='=');

fscanf(fpin, "%c", &ch1);
  fscanf(fpin, "%c", ciphertype);

do
  {
    fscanf(fpin, "%c", &ch1);
  } while(ch1!='=');

fscanf(fpin, "%c", &ch1);
  fscanf(fpin, "%c", grey);

do
  {
    fscanf(fpin, "%c", &ch1);
  } while(ch1!='=');

fscanf(fpin, "%c", &ch1);
  fscanf(fpin, "%c", keytype);

do
  {
    fscanf(fpin, "%c", &ch1);
  } while(ch1!='=');

fscanf(fpin, "%d", iter);

do
  {
    fscanf(fpin, "%c", &ch1);
  } while(ch1!='=');

fscanf(fpin, "%d", seed);
} void storekey(char* file, char ciphertype, char grey, char keytype, int iter, int seed, struct finite_vector key)
{
  int i;
  FILE* fpin;

if((fpin=fopen(file, "wb"))==NULL)
  {
    printf("\n*.key file not found. Exiting.\n");
    exit(1);
  } fprintf(fpin, "TYPE OF CIPHERING      = %c\n", ciphertype);
  fprintf(fpin, "GREY LEVEL MIXING      = %c\n", grey);
  fprintf(fpin, "KEY TYPE (RANDOM/CUSTOM) = %c\n", keytype);
  fprintf(fpin, "NUMBER OF ITERATIONS   = %d\n", iter);
  fprintf(fpin, "SEED                   = %d\n", seed);
  fprintf(fpin, "KEY                    = ");

for(i=0;i<key.len;i++) fprintf(fpin, "%d ", key.arr[i]);
  fclose(fpin);
}
```

Extract.c                3/6/97                                          11:57:20 AM

```c
void getkey(struct finite_vector* key, char* file)
{
  int i=0, count=0;

unsigned char ch;
  FILE* fpin;

if((fpin=fopen(file, "rb"))==NULL)
  {
    printf("\n.key file not found. Exiting.\n");
    exit(1);
  } while(count<6)
  {
    fscanf(fpin, "%c", &ch);
    if(ch=='=') count++;
  } while(fscanf(fpin, "%d", &key->arr[i++])!=EOF);

key->len=i-1;
  fclose(fpin);
}

/**********************************************************************/
/*** finddiv(N,m) returns the divisors of N. They are stored in
     the structure m, m.len=number of divisors, m.arr[] are the
     divisors.
 **********************************************************************/
void finddiv(int N, struct finite_vector* m)
{
  int i, count;

for(i=1, count=0;i<=N/2;i++)
  {
    if(N%i==0) m->arr[count++]=i;
  }
  m->len=count;
}

/************************** VERSION A ********************************/
/*** randkeya(seed,N,key) finds a random key for the integer N
     seed is used as a seed for srand(), the key is stored in key.
 **********************************************************************/
void randkeya(int seed, int N, struct finite_vector* key)
{
  int i, irand;
  struct finite_vector m;

srand(seed);
  finddiv(N,&m);
  i=0;

while(N>0)
  {
    do
    {
      irand=rnd(0, m.len);
    } while(m.arr[irand]>N);
```

Extract.c                       3/6/97                          11:57:20 AM

```c
    key->arr[i++]=m.arr[irand];
    N-=m.arr[irand];
  }
  key->len=i;
}

/********************** VERSION B **********************************/
/*** randkeyb(seed,N,key) finds a random key for the integer N
     seed is used as a seed for srand(), the key is stored in key.
 **********************************************************************/
void randkeyb(int seed, int N, struct finite_vector* key)
{
  int i,j,k,x,le,flag;
  int aux[MAXLENGTH];

srand(seed);
  le=rnd(10,15);
  aux[0]=0;
  aux[1]=N;
  i=1;

while(i<le)
  {
    x=rnd(0,N);
    flag=0;
    for(k=0;k<=i;k++) if(x==aux[k]) flag=1;

if(flag!=1)
    {
      i++;
      for(k=1;k<=i;k++)
      {
        if(x<aux[k] && x>aux[k-1])
        {
          for(j=i;j>=k;j--)
          {
            aux[j+1]=aux[j];
          } aux[k]=x;
        }
      }
    }
  } for(i=0;i<le;i++) key->arr[i]=aux[i+1]-aux[i];
  /*for(i=0;i<le;i++) printf("%d ", key->arr[i]);*/
  key->len=le;
}

/**********************************************************************/
/**** showkey prints the length of the key, and, on a separate line,
      the key itself (numbers divided by spaces).
 **********************************************************************/
void showkey(struct finite_vector key)
{
  int i;

printf("Length of the key    : %d\n", key.len);
  printf("Ciphering key        : ");
```

Extract.c    3/6/97    11:57:20 AM

```c
  for(i=0;i<key.len;i++) printf("%d ", key.arr[i]);
  printf("\n");
}
/******************************************************************/
/******************************************************************/
/******************************************************************/
/******************************************************************/
/******************************************************************/
/******************************************************************/
void main(int argc, char *argv[])
{
  int **ao, **as, **a, **na, **t1, **t2;
  int i, j, k, r, s, rr, ss, M, N, L, p, q;
  int No, Mo, Lo;
  int Ns, Ms, Ls;
  int iter, seed, auxi;
  int li[MAXLENGTH], ri[MAXLENGTH], re[MAXLENGTH];
  int co[MAXLENGTH];
  int **inca, **ninca;
  int t[2][2];
  int det, sum, raux, count, it, ng;
  char ciphertype, keytype, grey;
  struct finite_vector key;
  char image_name[64],carrier_image_name[64];

if(argc == 3)
  {
    strcpy(image_name,argv[1]);
    strcpy(carrier_image_name,argv[2]);
  }
  else
  {
    do printf("Enter the image name and the carrier image name: ");
    while(scanf("%s %s",image_name,carrier_image_name) != 2);
  }

/*********************************************************************
  ************ GETTING THE ENCRYPTED IMAGE IN PGM FORMAT *************
  *********************************************************************/
  /**** Ns x Ms ... dimensions of the carrier image with embedded secret
                    information
        Ls ........ number of gray levels in the subliminal image
        as[][] .... matrix of gray levels of the subliminal image ****/ printf("Reading subli.ras\n");
  getras("subli.ras", &Ns, &Ms, &Ls, &as);Ls=255;
  /**** No x Mo ... dimensions of the carrier image without embedded secret
                    information
        Lo ........ number of gray levels in the carrier image
        ao[][] .... matrix of gray levels of the carrier image ****/ printf("Reading the carrier image\n");
  getras(carrier_image_name, &No, &Mo, &Lo, &ao);Lo=255;

if(Ns!=No || Ms!=Mo || Ls!=Lo)
  {
    printf("Incompatible subliminal image dimensions. Exiting.\n");
    exit(1);
  }
```

Extract.c                     3/6/97                              11:57:21 AM

```c
/** calculating the dimensions of the secretly embedded image **/ printf("Extracting the hidden image\n");
N=Ns/2;M=Ms/2;L=Ls;
a=matrix(N,M);

for(p=0;p<N;p++)
{
   for(q=0;q<M;q++)
   {
     /**** for gray levels a[i][j] in interval [2,L-1], we calculate
           t[i][j] as carrier-subliminal+1
           When a[i][j]=L, we substract 1
           When a[i][j]=1, we add 1
           When a[i][j]=0, we add 2 ****/ for(i=0;i<2;i++)
     {
        for(j=0;j<2;j++)
        {
           auxi=ao[2*p+i][2*q+j];
           t[i][j]=auxi-as[2*p+i][2*q+j]+1;

if(auxi==L) t[i][j]-=1;
           else if(auxi==1) t[i][j]+=1;
           else if(auxi==0) t[i][j]+=2;

if(t[i][j]<0) printf("t(i,j) negative!\n");
           if(t[i][j]>3) printf("t(i,j) > 3!\n");
        }
     }
     /**** the gray level a[][]=t[0][0]+4t[1][0]+16t[0][1]+64t[1][1]
           where 0 <= t[i][j] < 4 ****/ a[p][q]=t[0][0]+4*t[1][0]+16*t[0][1]+64*t[1][1];
   }
}
/** Decipher the recovered image using .key file image_name.key **/ printf("Deciphering the hidden image\n");
printf("N = %d  M = %d\n", N, M);

inca=matrix(N,M);
ninca=matrix(N,M);

getcipher(key_(image_name), &ciphertype, &grey, &keytype, &iter, &seed);

printf("\n");
printf("Ciphertype          : %c\n", ciphertype);
printf("Grey level mixing   : %c\n", grey);
printf("Keytype             : %c\n", keytype);
printf("Number of iterations : %d\n", iter);

/*****************************************************************
*********************** GETTING THE KEY ***********************
*****************************************************************/
getkey(&key, key_(image_name));
showkey(key);
```

Extract.c     3/6/97     11:57:21 AM

```c
/*******************************************************************
 ********  CALCULATING THE INVERSE TRANSFER MATRIX FOR CAT MAP *******
 *******************************************************************/
printf("\nComputing the inverse transfer matrix\n");

t1=matrix(N,M);
t2=matrix(N,M);
na=matrix(N,M);

if(ciphertype=='C')
{
  k=0;
  for(j=0;j<M;j++)
  {
    for(i=0;i<N;i++)
    {
      r=key.arr[4*k]*i+key.arr[4*k+1]*j;
      s=key.arr[4*k+2]*i+key.arr[4*k+3]*j;
      r=r-N*sint(((float) r)/N);
      s=s-M*sint(((float) s)/M);
      if(r<0 || s<0 || r>=N || s>=M)
      {
        printf("Index mismatch during ciphering in CAT.\n");
        printf("Exiting.\n");
        exit(1);
      } t1[r][s]=i;
      t2[r][s]=j;
    }
  }
}

/*******************************************************************
 ******  CALCULATING THE INVERSE TRANSFER MATRIX FOR BAKER MAP *******
 *******************************************************************/
if(ciphertype=='B')
{
  ri[0]=key.arr[0]-1;li[0]=0;
  for(i=1;i<key.len;i++)
  {
    li[i]=ri[i-1];

ri[i]=ri[i-1]+key.arr[i];
  } re[0]=key.arr[0]*M % N;
  for(i=1;i<key.len;i++) re[i]=(key.arr[i]*M+re[i-1]) % N;

for(i=0,k=0;i<N;i++)
  {
    for(j=0;j<M;j++)
    {
      if(i<ri[k] || (i==ri[k]&&j<M-re[k])) inca[i][j]=k;
      else inca[i][j]=++k;
    }
  } for(k=0,count=0;k<key.len;k++)
  {
    for(j=0;j<M;j++)
```

Extract.c                    3/6/97                              11:57:21 AM

```c
      {
        for(i=li[k];i<=ri[k];i++) if(inca[i][j]==k) ninca[i][j]=count++/N;
      }
    }
    for(j=0;j<M;j++) co[j]=0;

for(i=0;i<N;i++)
    {
      for(j=0;j<M;j++)
      {
        t1[co[ninca[i][j]] % N][ninca[i][j]]=i;
        t2[co[ninca[i][j]] % N][ninca[i][j]]=j;
        co[ninca[i][j]]+=1;
      }
    }
  }
  /*******************************************************************
  ** DECRYPTING USING THE TRANSFER MATRIX (BOTH FOR BAKER AND FOR CAT) *
  *******************************************************************/
  printf("Decrypting.\n");

for(s=0;s<M;s++)
  {
    for(r=0;r<N;r++)
    {
      rr=r;ss=s;ng=a[r][s];
      for(it=1;it<=iter;it++)
      {
        raux=t1[rr][ss];
        ss=t2[rr][ss];
        rr=raux;
        if(grey=='Y')
        {
          ng=(ng-(rr*ss))%256;
          /*ng=ng^ss;*/
          while(ng<0) ng+=256;
        }
      }
      if(rr>=N || ss>=M) {printf("rr or ss out of range. Exiting.\n"); exit(1);}
      na[rr][ss]=ng;
    }
  }

/*******************************************************************
  ****************** STORING THE EXTRACTED IMAGE **********************
  *******************************************************************/
  printf("Storing the extracted image.\n");
  makeras("extract.ras", N, M, L, na);
}
```

What is claimed is:

1. A method of encrypting/embedding and decrypting/extracting a secret image, comprising the steps of:
   a) encrypting a secret image of N×M pixels with $g_{ij}$ gray levels using a chaotic map;
   b) choosing some carrier image of 2N×2M pixels with $g_{ij}$ gray levels;
   c) modifying said carrier image according to a pseudocode, including the further steps of:
      i) for each pixel P=(i, j) of the secret image, converting the gray level $g_{ij}$ to a base 4 representation, t1, t2, t3, t4, where $t1+t2*4+t3*16+t4*64=g_{ij}$; and
      ii) modifying the gray levels of pixels (2i, 2j), (2i+1, 2j), (2i, 2j+1), (2i+1, 2j+1) of the carrier image by 2−t1, 2−t2, 2−t3, and 2−t4, respectively; and
   d) sending said modified carrier image to a recipient.

2. The method of encrypting/embedding and decrypting/extracting a secret image in accordance with claim 1, further comprising the steps of:
   e) extracting said encrypted secret image from said modified carrier image by subtracting said modified carrier image of step (c) from said original carrier image using a pseudocode, comprising the further steps of:
      i) for each (i, j), $0 \leq i \leq N-1$, and $0 \leq j \leq M-1$, taking the four values at positions (2i, 2j), (2i+1, 2j), (2i, 2j+1), (2i+1, 2j+1) of the subtracted image to be t1, t2, t3, t4, respectively; and
      ii) recovering the gray level $g_{ij}$ of said encrypted N×M image by applying the formula $g_{ij}=t1+4*t2+16*t3+64*t4$, where $0 \leq t1, t2, t3, t4 \leq 3$; and
   f) decrypting said encrypted image and recovering said original secret image.

3. A method of hiding a message in an information carrier, the steps comprising:
   a) encrypting a message with the use of a chaotic baker map;
   b) choosing an information carrier comprising a set of pixels;
   c) coding the shade or color level of said encrypted message using a set of pixels in said information carrier;
   d) modifying said shade or color level of each of said pixels of said coded message by one of a plurality of values; and
   e) transmitting said modified message.

4. The method of hiding a message in an information carrier in accordance with claim 3, wherein said message comprises text.

5. The method of hiding a message in an information carrier in accordance with claim 3, wherein said message comprises an image.

6. The method of hiding a message in an information carrier in accordance with claim 4, wherein said information carrier comprises a digital image.

7. The method of hiding a message in an information carrier in accordance with claim 5, wherein said information carrier comprises a digital image.

8. The method of hiding a message in an information carrier in accordance with claim 7, wherein said shade level of said encrypted message comprise numbers representative of shades of gray.

9. The method of hiding a message in an information carrier in accordance with claim 7, wherein said color level of said encrypted message comprise numbers representative of unique colors.

10. The method of hiding a message in an information carrier in accordance with claim 5, wherein said shade level of said encrypted message comprise numbers representative of shades of gray.

11. The method of hiding a message in an information carrier in accordance with claim 4, wherein said plurality of values comprises the numbers 1, 0, −1 and −2.

12. The method of hiding a message in an information carrier in accordance with claim 5, wherein said plurality of values comprises the numbers 1, 0, −1 and −2.

13. The method of hiding a message in an information carrier in accordance with claim 8, wherein said information carrier image comprises 2N×2M pixels with 256 gray levels.

14. The method of hiding a message in an information carrier in accordance with claim 9, wherein said information carrier image comprises 2N×2M pixels with 256 colors.

15. The method of hiding a message in an information carrier in accordance with claim 8, wherein said modifying step (d) comprises:
   i) for each pixel P=(i, j) of the message, converting the gray level $g_{ij}$ to a base 4 representation, t1, t2, t3, t4, where $t1+t2*4+t3*16+t4*64=g_{ij}$; and
   ii) modifying the gray levels of pixels (2i, 2j), (2i+1, 2j), (2i, 2j+1), (2i+1, 2j+1) of the information carrier by 2−t1, 2−t2, 2−t3, and 2−t4, respectively.

16. The method of hiding a message in an information carrier in accordance with claim 10, wherein said modifying step (d) comprises:
   i) for each pixel P=(i, j) of the message, converting the gray level $g_{ij}$ to a base 4 representation, t1, t2, t3, t4, where $t1+t2*4+t3*16+t4*64=g_{ij}$; and
   ii) modifying the gray levels of pixels (2i, 2j), (2i+1, 2j), (2i, 2j+1), (2i+1, 2j+1) of the information carrier by 2−t1, 2−t2, 2−t3, and 2−t4, respectively.

17. The method of hiding a message in an information carrier in accordance with claim 11, wherein said modifying step (d) comprises:
   i) for each pixel P=(i, j) of the message, converting the gray level $g_{ij}$ to a base 4 representation, t1, t2, t3, t4, where $t1+t2*4+t3*16+t4*64=g_{ij}$; and
   ii) modifying the gray levels of pixels (2i, 2j), (2i+1, 2j), (2i, 2j+1), (2i+1, 2j+1) of the information carrier by 2−t1, 2−t2, 2−t3, and 2−t4, respectively.

18. The method of hiding a message in an information carrier in accordance with claim 13, wherein said modifying step (d) comprises:
   i) for each pixel P=(i, j) of the message, converting the gray level $g_{ij}$ to a base 4 representation, t1, t2, t3, t4, where $t1+t2*4+t3*16+t4*64=g_{ij}$; and
   ii) modifying the gray levels of pixels (2i, 2j), (2i+1, 2j), (2i, 2j+1), (2i+1, 2j+1) of the information carrier by 2−t1, 2−t2, 2−t3, and 2−t4, respectively.

* * * * *

UNITED STATES PATENT AND TRADEMARK OFFICE
CERTIFICATE OF CORRECTION

PATENT NO.   : 6,094,483
DATED        : July 25, 2000
INVENTOR(S)  : Jiri Fridrich and Richard J. Simard It is certified that error appears in the above-identified patent and that said Letters Patent is hereby corrected as shown below:

<u>Title page,</u>
Before "Field of the Invention", please insert the following paragraph:
-- This invention was made with Government support under contract F30602-96-1-0047 to Department of the Air Force, Rome Laboratory/ERT, 525 Brooks Road, Rome, NY 13441-4505, and the Government has certain rights in this invention. --

Signed and Sealed this

Eleventh Day of September, 2001

*Attest:*

*Attesting Officer*

NICHOLAS P. GODICI
*Acting Director of the United States Patent and Trademark Office*